(12) United States Patent
Trojer et al.

(10) Patent No.: US 11,290,169 B2
(45) Date of Patent: Mar. 29, 2022

(54) METHODS, SYSTEMS AND UNITS OF A DISTRIBUTED BASE STATION SYSTEM FOR HANDLING OF DOWNLINK COMMUNICATION

(71) Applicant: Telefonaktiebolaget LM Ericsson (publ), Stockholm (SE)

(72) Inventors: Elmar Trojer, Täby (SE); Miguel Berg, Sollentuna (SE); Yezi Huang, Täby (SE); Chenguang Lu, Sollentuna (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 9 days.

(21) Appl. No.: 16/765,472

(22) PCT Filed: Nov. 20, 2017

(86) PCT No.: PCT/SE2017/051149
§ 371 (c)(1),
(2) Date: May 19, 2020

(87) PCT Pub. No.: WO2019/098897
PCT Pub. Date: May 23, 2019

(65) Prior Publication Data
US 2020/0287608 A1    Sep. 10, 2020

(51) Int. Cl.
*H04B 7/06* (2006.01)
*H04B 7/024* (2017.01)
(Continued)

(52) U.S. Cl.
CPC ........... *H04B 7/0634* (2013.01); *H04B 7/024* (2013.01); *H04B 7/0456* (2013.01); *H04B 7/0617* (2013.01); *H04W 88/085* (2013.01)

(58) Field of Classification Search
CPC .............. H04L 5/005; H04W 72/042; H04W 72/0413; H04W 88/085; H04B 7/0626;
(Continued)

(56) References Cited

U.S. PATENT DOCUMENTS

| 2010/0150013 A1* | 6/2010 | Hara | ....................... H04B 17/12 370/252 |
| 2015/0358057 A1* | 12/2015 | Lindqvist | .............. H04L 5/1469 370/329 |

FOREIGN PATENT DOCUMENTS

WO    2018231107 A1    12/2018

OTHER PUBLICATIONS

International Search Report and Written Opinion for International Application No. PCT/SE2017/051149, dated Jul. 26, 2018, 15 pages.
(Continued)

*Primary Examiner* — Sung S Ahn
(74) *Attorney, Agent, or Firm* — NDWE LLP

(57) ABSTRACT

A method performed by a RRU of a distributed base station system, which further comprising a BBU, connected to the RRU. The RRU is arranged to wirelessly communicate with at least one UE. The method comprises determining a downlink channel estimate from received uplink signals and determining a first part of precoding coefficients to be used for precoding signals to be sent downlink to the at least one UE based on the determined downlink channel estimate. The method further comprises receiving a second part of the precoding coefficients from the BBU, precoding downlink signals of data received from the BBU using the first and the second part of the precoding coefficients and sending the precoded downlink signals to the at least one UE via the plurality of antennas.

18 Claims, 6 Drawing Sheets

(51) Int. Cl.
*H04B 7/0456* (2017.01)
*H04W 88/08* (2009.01)

(58) Field of Classification Search
CPC .... H04B 7/0634; H04B 7/024; H04B 7/0456; H04B 7/0617
See application file for complete search history.

(56) References Cited

OTHER PUBLICATIONS

Amadori et al., "Low RF-Complexity Millimeter-Wave Beamspace-MIMO Systems by Beam Selection," Jun. 2015, pp. 2212-2223, IEEE Transactions on Communications, vol. 63, No. 6.
Bartelt et al., "Fronthaul and Backhaul Requirements of Flexibly Centralized Radio Access Networks," Oct. 2015, pp. 105-111, IEEE Wireless Communications.
3GPP TR 38.801, "3rd Generation Partnership Project; Technical Specification Group Radio Access Network; Study on New Radio Access Technology; Radio Access Architecture and Interfaces (Release 14)," Mar. 2017, 90 pages, V2.0.0, 3GPP Organizational Partners.
3GPP TR 38.801, "3rd Generation Partnership Project; Technical Specification Group Radio Access Network; Study on New Radio Access Technology; Radio Access Architecture and Interfaces (Release 14)," Mar. 2017, 91 pages, V14.0.0, 3GPP Organizational Partners.

\* cited by examiner

METHODS, SYSTEMS AND UNITS OF A DISTRIBUTED BASE STATION SYSTEM FOR HANDLING OF DOWNLINK COMMUNICATION

CROSS-REFERENCE TO RELATED APPLICATIONS

This application is a National stage of International Application No. PCT/SE2017/051149, filed Nov. 20, 2017, which is hereby incorporated by reference.

TECHNICAL FIELD

The present disclosure relates generally to methods, systems and units of a distributed base station system for handling of downlink communication. More specifically, the present disclosure relates to an RRU and a method performed by such an RRU of a distributed base station system of a wireless communication network, wherein the distributed base station system further comprises a BBU connected to the RRU, and the RRU is connected to a plurality of antennas through which the RRU wirelessly communicates with at least one UE. The present disclosure further relates to corresponding methods and systems of wireless communication networks as well as computer programs and carriers.

BACKGROUND

In a centralized radio access network, C-RAN, also called a distributed base station system, radio access network, RAN, processing is conducted by two separate units: a remote radio unit, RRU, and a base band unit, BBU. The BBU is connected to the RRU via a fronthaul link. The RRU is connected to one or more antennas through which the RRU wirelessly communicates with at least one user equipment, UE. The BBU is in its turn connected to other base station systems or base stations, and to a core network of a wireless communication system. The BBU is centralized and there may be more than one RRU connected to each BBU. Traditionally, the BBU performs advanced radio coordination features such as joint detection, joint decoding, coordinated multi-point transmission, CoMP, to increase the spectrum efficiency and network capacity, as well as baseband processing, whereas the RRUs perform radio frequency, RF, processing and transmission/reception of the RF processed signals. Such a split of base station functionality between BBU and RRU is called a PHY-RF split.

Originally, the RRU was designed to reduce the cable loss of the coax cables between an antenna tower top where the actual antennas are situated and the bottom of the antenna tower where the base station functionality is hosted. Therefore, before 5$^{th}$ Generation of mobile communication, 5G, i.e. at 4G, e.g. Long Term Evolution, LTE, the RRU was rather simple and was mainly doing RF processing with limited baseband processing, if any.

When going from 4G to 5G, there is a need to increase the wireless communication capacity towards the UEs in order to be able to deliver requested data amounts per time period in 5G. One enabler of the mobile evolution towards 5G is massive Multiple Input Multiple Output, MIMO, in which each RRU has a plurality of antennas. In other words, massive MIMO exploits spatial multiplexing to improve spectrum efficiency by using antenna arrays at the RRU, which antenna array is equipped with N antennas simultaneously serving K user-layers in the same time-frequency resource. The typical scenario is N>>K. e.g., N is 64, 128 or 256 while K is 8 or 16. As shown, the number of antennas are quite large. To support such massive MIMO solutions, the required fronthaul link capacity needs to increase in proportion to the increase of number of antennas, when using the current PHY-RF split between functionality of BBU and RRU. This will dramatically drive up the fronthaul link costs.

To address this, new split options regarding fronthaul functionality have been discussed in 3GPP, see 3GPP TR 38.801, V14.0.0: "Study on new radio access technology: Radio access architecture and interfaces", published March 2017. Some of the discussed split options (option 7-2, 7-3), as well as the current PHY-RF split (option 8) are shown in FIG. 1. A discussed split option is an Intra PHY split option called option 7-2 in FIG. 1, in which Inverse Fast Fourier Transformation, IFFT, and mapping is performed in the RRU, as well as the digital to RF conversion. The 7-2 split option increases fronthaul efficiency and hereby reduces the need for fronthaul capacity due to reduced frequency redundancy and by adapting the fronthaul bit rate to traffic load, which is possible when IFFT and mapping is performed in the RRU instead of in the BBU. However, there is still a problem that there is one bit stream per antenna transmitted over the front haul, and for massive MIMO there will still be very much data needed to be sent over the fronthaul link.

In order to achieve a split between functionality of the RRU and the BBU so that the RRU becomes cost-efficient and also so that the fronthaul connection capacity can be kept on a reasonable level, the split option 7-3 has been suggested. Here the BBU encodes the data of MIMO user layers and sends coded data per user layer to the RRU, in which also modulation and precoding is performed at the RRU, in addition to the functionality of option 7-2. This lowers the amount of bit streams to be sent over the fronthaul link down to the number of MIMO user layers and consequently reduces the necessary capacity of the fronthaul link, as well as reduces the needed number of bits per sample.

Precoding coefficients are usually calculated in the BBU and sent to the RRU via the fronthaul link, and the RRU performs the precoding based on the precoding coefficients. A reason for calculating the precoding coefficients in the BBU instead of in the RRU is that the coefficient calculation requires intensive computational operations and it is a request to make the RRU as simple as possible for cost efficiency reasons. However, the amount of precoding coefficients $N_p$ is proportional to the number of antennas N and the number of user layers K. For massive MIMO, the number of antennas N is large and therefore the amount of precoding coefficients $N_p$ increases dramatically. Consequently, a lot of the fronthaul capacity is taken for transporting precoding coefficients at the expense of transporting actual signals. When assuming 12 subcarriers, i.e. one resource block, RB, in LTE, per precoding coefficient, 64 antennas and 16 bits for each coefficient, the number of bits per subcarrier per layer becomes 16*64/12=85.3 bits, which is more than 10 times larger than 8 bits of 256 Quadrature Amplitude Modulation, QAM, for data. If the precoder needs to update every 14 symbols, which means every 1 ms in LTE, the number of bits for the precoding coefficients per subcarrier per layer per symbol that needs to be sent from the BBU to the precoder of the RRU over the fronthaul link becomes 16*64/12/14=6.1 bits. Regarding 256 QAM data symbols, 43% of the fronthaul link traffic will then be precoding coefficients. This will increase further when the antenna size increases, e.g. to 128 and 256 etc. Therefore, with massive MIMO, the fronthaul link overhead for transporting the precoding coefficients is very large and can dominate the fronthaul link traffic for large configurations.

In "Low RF-Complexity Millimeter-Wave Beamspace-MIMO Systems by Beam Selection," by Amadori et al, published in IEEE Transactions on Communications, vol. 63, no. 6, pp. 2212-2223, June 2015, there is one method referred to as direction selection, DS or beam selection, BS, which is able to reduce the fronthaul link overhead. In this work, we refer to as DS method to facilitate the denotation. It is discussed in a hybrid beamforming scenario. The idea can be used to reduce the number of precoding coefficients through fronthaul link. In the DS method, the RRU generates a fixed number of directive beams towards many directions covering the service area. The fixed number of beams are formed with a set of fixed beamforming coefficients. For example, applying Discrete Fourier Transform, DFT, coefficients on the signals towards the antenna elements can generate the same number of beams as the number of antenna elements. To simplify the denotation, the directive beams are called "the directions". The BBU selects a subset of the directions according to the channel information and calculate the coefficients corresponding to the subset of the directions. Since the number of selected directions are smaller than the number of antennas, the number of the coefficients for the selected directions is reduced compared to the original case. The method is based on the fact that the propagation concentrates to some dominant directions, from the main reflections around. We show further down in this document in documentation of simulation results that the DS needs to select much more directions than the number of user layers and therefore the reduction of the coefficients number is limited.

As shown, there is a need for an improved solution for handling transmission of downlink data in a distributed base station system comprising a BBU and a RRU. Also, there is a need for a solution that more efficiently uses fronthaul link capacity and still achieves good air interface performance in a distributed base station system.

SUMMARY

It is an object of the invention to address at least some of the problems and issues outlined above. It is possible to achieve these objects and others by using a method and an apparatus as defined in the attached independent claims.

According to one aspect, a method is provided performed by a RRU of a distributed base station system of a wireless communication network. The distributed base station system further comprising a BBU connected to the RRU. The RRU is connected to a plurality of antennas through which the RRU wirelessly communicates with at least one UE. The method comprises receiving uplink signals from the at least one UE, determining a downlink channel estimate from the received uplink signals, determining a first part of precoding coefficients to be used for precoding signals to be sent downlink to the at least one UE based on the determined downlink channel estimate, and sending information related to the received uplink signals to the BBU. The method further comprises receiving a second part of the precoding coefficients from the BBU, the second part of the precoding coefficients being determined based on the sent information, precoding downlink signals of data received from the BBU using the first and the second part of the precoding coefficients, and sending the precoded downlink signals to the at least one UE via the plurality of antennas.

According to another aspect, a method is provided performed by a system of a wireless communication network, the wireless communication network comprising a distributed base station system having a BBU and a RRU connected to the BBU. The method comprises receiving, from the RRU, information related to uplink signals received by the RRU from at least one UE wirelessly connected to the RRU, determining, based on the received information, only a second part of precoding coefficients for precoding downlink signals to be sent by the RRU to the UEs, the precoding coefficients comprising a first part and the second part, and sending the determined second part of the precoding coefficients to the RRU, so that the RRU can use the second part of the precoding coefficients together with the first part of the precoding coefficients for precoding downlink signals to be sent to the UEs.

According to another aspect, a RRU is provided operable in a distributed base station system of a wireless communication network. The distributed base station system further comprises a BBU connected to the RRU. The RRU is operative for wireless communication with at least one UE through a plurality of antennas. The RRU comprises a processor and a memory. Said memory contains instructions executable by said processor, whereby the RRU is operative for receiving uplink signals from the at least one UE, determining a downlink channel estimate from the received uplink signals, and determining a first part of precoding coefficients to be used for precoding signals to be sent downlink to the at least one UE based on the determined downlink channel estimate. The RRU is further operative for sending information related to the received uplink signals to the BBU, receiving a second part of the precoding coefficients from the BBU, the second part of the precoding coefficients being determined based on the sent information, precoding downlink signals of data received from the BBU using the first and the second part of the precoding coefficients, and sending the precoded downlink signals to the at least one UE via the plurality of antennas.

According to another aspect, a system is provided operable in a wireless communication network. The wireless communication network comprises a distributed base station system having a BBU and a RRU connected to the BBU. The system comprises a processor and a memory. Said memory contains instructions executable by said processor, whereby the system is operative for receiving, from the RRU, information related to uplink signals received by the RRU from at least one UE, wirelessly connected to the RRU. The system is further operative for determining, based on the received information, only a second part of precoding coefficients for precoding downlink signals to be sent by the RRU to the UEs, the precoding coefficients comprising a first part and the second part, and sending the determined second part of the precoding coefficients to the RRU, so that the RRU can use the second part of the precoding coefficients together with the first part of the precoding coefficients for precoding downlink signals to be sent to the UEs.

According to other aspects, computer programs and carriers are also provided, the details of which will be described in the claims and the detailed description.

Further possible features and benefits of this solution will become apparent from the detailed description below.

BRIEF DESCRIPTION OF DRAWINGS

The solution will now be described in more detail by means of exemplary embodiments and with reference to the accompanying drawings, in which.

DETAILED DESCRIPTION

According to an embodiment, in order to make a more efficient split of RAN processing functionality between the RRU and the BBU when the RRU has a plurality of antennas, the present invention suggests to decompose the precoding coefficients into two parts, wherein a first part is determined in the RRU and a smaller second part is determined in the BBU and sent from the BBU to the RRU. Then at the RRU, the first and the second parts of the precoding coefficients are used for precoding signals to be sent from the RRU to the UEs via the multiple antennas. By such a solution, a cost-efficient usage of fronthaul link capacity is achieved at the same time as good air interface performance and a cost-efficient RRU.

Figure 1:
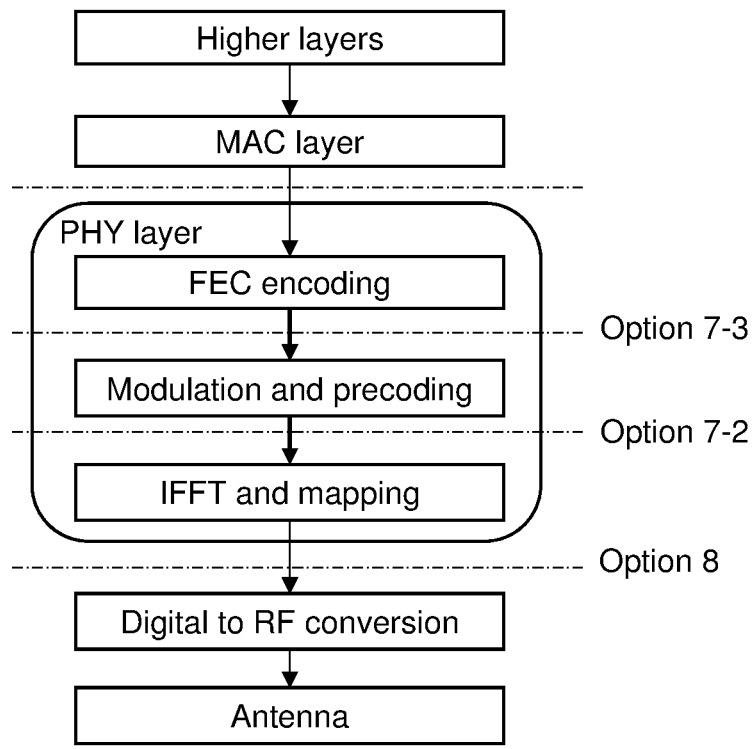
FIG. 1 is a schematic block diagram illustrating different possible splits of functionality in downlink between a BBU and a RRU according to prior art.
Figure 2:
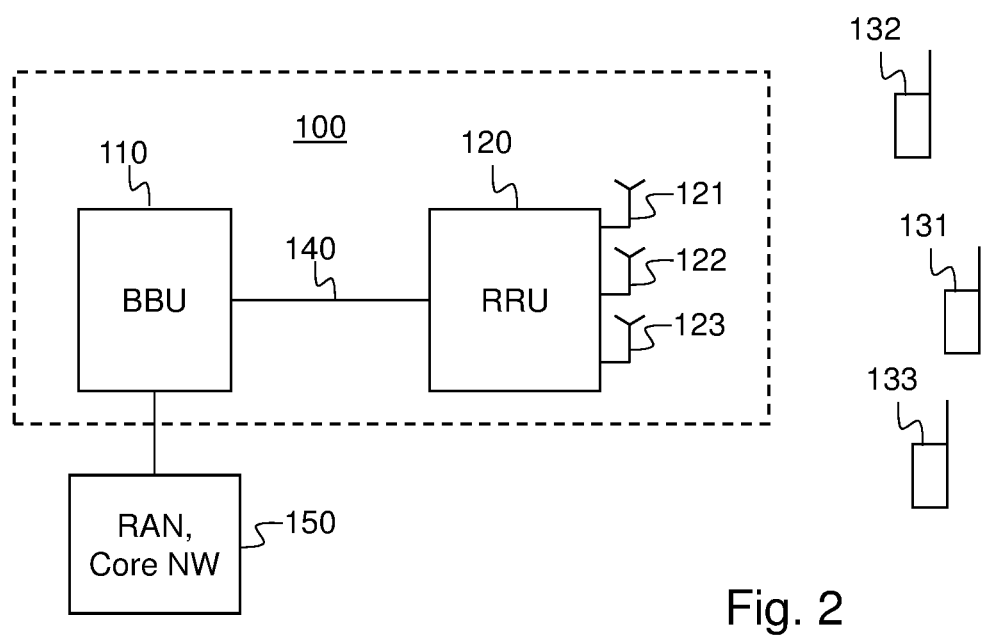
FIG. 2 is a schematic block diagram of a wireless communication system including a distributed base station system in which the present invention maybe used.

FIG. 2 illustrates a wireless communication network in which the present invention may be used. The wireless communication network comprises a distributed base station system 100, which in turn comprises a BBU 110 and a RRU 120. The BBU 110 has connections to other base station nodes or other RAN nodes and further to a core network (symbolized with 150 in FIG. 2) so that the distributed base station system can communicate to other nodes of the communication network. The BBU is connected with the RRU via a fronthaul link 140. The fronthaul link 140 may be any kind of connection, such as a dedicated wireline or wireless connection or a connection via a network, as long as the connection fulfills fronthaul requirements, e.g. in capacity and latency. The RRU further has a plurality of antennas 121, 122, 123 through which wireless signals are communicated towards and from one or more UEs 131, 132, 133. The wireless signals comprises data to be communicated from or to the UEs 131, 132, 133. The BBU 110 and the RRU 120 comprise RAN functionality for handling the data and signals to be communicated between the RRU 120 and the UEs 131, 132, 133. The RAN functionality is distributed between the BBU and the RRU as will be described further down in this disclosure.

Figure 3:
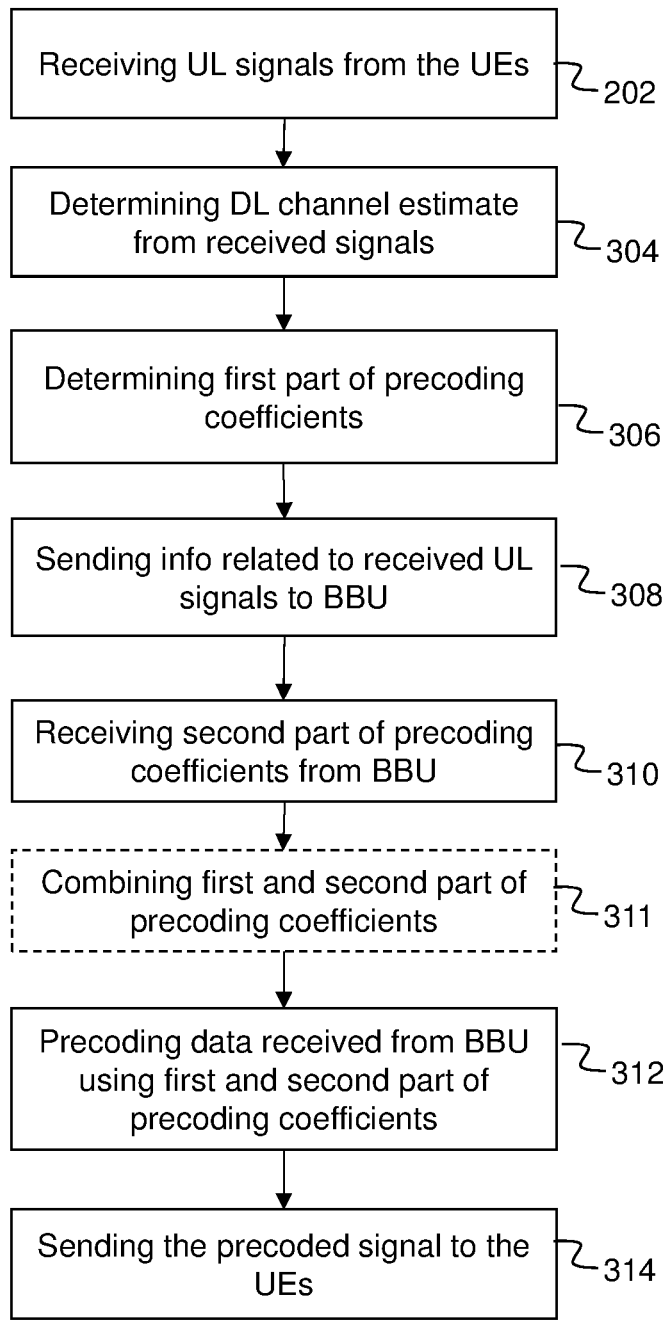
FIG. 3 is a flow chart illustrating a method performed by a RRU, according to possible embodiments.

FIG. 3, in conjunction with FIG. 2, describes a method performed by a RRU 120 of a distributed base station system 100 of a wireless communication network. The distributed base station system 100 further comprising a BBU 110 connected to the RRU. The RRU 120 is connected to a plurality of antennas 121, 122, 123 through which the RRU wirelessly communicates with at least one UE 131, 132, 133. The method comprises receiving 302 uplink signals from the at least one UE, determining 304 a downlink channel estimate from the received uplink signals, e.g. based on channel reciprocity between uplink and downlink signals, determining 306 a first part of precoding coefficients to be used for precoding signals to be sent downlink to the at least one UE 131, 132, 133 based on the determined downlink channel estimate, and sending 308 information related to the received uplink signals to the BBU. The method further comprises receiving 310 a second part of the precoding coefficients from the BBU, the second part of the precoding coefficients being determined based on the sent information, precoding 312 downlink signals of data received from the BBU using the first and the second part of the precoding coefficients, and sending 314 the precoded downlink signals to the at least one UE via the plurality of antennas.

By determining a first part of the precoding coefficients at the RRU and by receiving a second part of the precoding coefficients from the BBU, a good balance can be achieved between a low complex cost-efficient RRU and a front haul interface having a limited transmission capacity. As a result, a cost-efficient distributed base station can be achieved that at the same time provides a high quality air interface.

The uplink signals may be uplink reference signals such as Sounding Reference Signals, SRS, De-Modulation Reference Signal, DMRS or any other signal that may be defined for the purpose of assisting downlink channel estimation. An uplink channel may be estimated from the uplink signals and the downlink channel estimate may be determined from the estimated uplink channel, for example by removing frontend difference from the estimated uplink channel and the UE transmit power. Alternatively, the downlink channel estimate may be determined directly from the received uplink signals. The invention is applicable to any kind of wireless communication technology, such as technologies based on Time Division Multiple Access, TDMA, Frequency Division Multiple Access, FDMA, Code Division Multiple Access, CDMA, Orthogonal Frequency-division Multiple Access, OFDMA, Time Division Duplex, TDD, or Frequency Division Duplex, FDD. The invention is especially advantageous in TDD-based technologies, as in TDD the downlink and uplink channels are reciprocal over the air. In TDD, any difference between uplink and downlink channel is mainly from the radio frontend difference in uplink and downlink, which difference can be calibrated out. The information related to the received uplink signals, sent to the BBU, could be the actual uplink signal or a channel estimate H of the uplink signal or any information on which the channel estimate can be determined. According to an embodiment, the BBU is informed of what beamforming operation the RRU will take, and consequently, which part of the precoding coefficients the RRU will determine. This may be set at configuration so that the BBU is informed from the configuration which beamforming operation the RRU will take and therefore which beamforming operation the BBU should take.

"Pre-coding" signifies a spatial coding defining how the downlink signals of different user layers are to be distributed from the individual antennas 121, 122, 123 when transmitted from the antennas towards the UEs 131, 132, 133. For multiple user layers, the transmit signal of each antenna is a linear combination of the signal of different user layers, in which the signal of each user layer is multiplied with a precoding coefficient and then the multiplication results of all signal of user layers are added together. In a special case of only one user layer, the transmitted signal of each antenna is the signal of the user layer multiplied with a precoding coefficient. The precoding works in the signal domain, to achieve the array gain, spatial diversity gain, spatial multiplexing gain and interference mitigation spatially. This is not to be mixed with encoding and decoding of data, which deals with e.g. adding redundancy in the bit domain in order to make the transmitted data more robust to interference, or to compress data in order to be able to send less bits than the original data.

According to an embodiment, the method further comprises combining 311 the first part of the precoding coefficients with the second part of the precoding coefficients before the precoding of downlink signals with the combined first and second parts of the precoding coefficients. By combining the first and second parts of the precoding coefficients before precoding the downlink signals, the number of multiplications with the downlink signals is saved. Otherwise, the downlink signals need to be multiplied twice, first with the second part of the precoding coefficient, and then with the first part of the precoding coefficients. The precoding coefficients may be described in a matrix format, consequently, a first matrix for the first part of the precoding coefficients and a second matrix for the second part of the precoding coefficients. In such an embodiment, the downlink signal is described in a vector format where each vector element denotes a signal of a user layer. A combination of the first and second matrix would then be multiplied with the downlink signal. By combining the first and second matrices and storing them as a combined matrix may also save memory, as a matrix with the first and second matrix combined has smaller number of coefficients than that of two separate matrices.

According to another embodiment, the first part of the precoding coefficients contains more information than the second part of the precoding coefficients. By determining precoding coefficient having more information, e.g. a larger part of the precoding coefficients, at the RRU and a smaller part at the BBU, an even smaller part of coefficients is needed to be sent over the fronthaul link, whereby fronthaul capacity is further saved.

According to another embodiment, the first part of the precoding coefficients is determined 306 so as to spatially concentrate energy transmitted from the antennas in directions towards the UEs, and the second part of the precoding coefficients is determined so as to pre-mitigate interference. Normally, it is less computing-intensive to determine precoding coefficients for spatially concentrating energy than for mitigating interference. Therefore, the RRU would only need to increase computing power moderately, compared to computing power needed in the RRU when computing all coefficients in the BBU, when the determining of the precoding coefficients for spatially concentrating energy is moved to the RRU. The second part of the precoding coefficients may be determined so as to pre-mitigate interference in order to further improve Signal to Interference Ratio, SIR. The wording pre-mitigate is used because there is no interference to mitigate yet at the transmitter side. The beamforming scheme pre-mitigates the interferences which otherwise will happen at the receiver side.

According to another embodiment, the first part of the precoding coefficients is determined 306 based on a Maximum Ratio Transmission, MRT, operation on the downlink channel estimate. As shown further down in this document, an MRT-based method results in better air interface performance compared to the DS method, while fewer precoding coefficients need to be sent through the fronthaul link.

According to another embodiment, the downlink channel estimate is determined 304 in a matrix format H, and wherein the first part of the precoding coefficients is determined 306 as the Hermitian transpose H* of the channel estimate matrix H. An inverse matrix operation is a complex operation whereas a Hermitian transpose operation is a simple operation in relation to the inverse matrix operation. The complex inverse matrix operation is here performed by the BBU, as can be seen in relation to FIG. 4 describing the steps performed by the BBU. By making the complex operation at the BBU and an inverse-free, i.e. simpler operation at the RRU, the complexity increase of RRU is moderate compared to performing all computing of precoding coefficients at the BBU. Hereby, a cost-efficient RRU can still be achieved.

Figure 4:
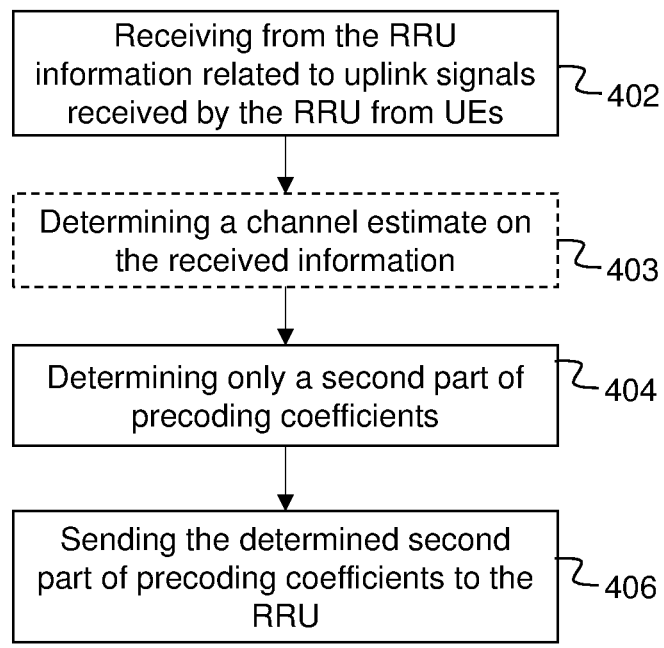
FIG. 4 is a flow chart illustrating a method performed by a BBU, according to possible embodiments.

FIG. 4, in conjunction with FIG. 2, describes a method performed by a system of a wireless communication network, the wireless communication network comprising a distributed base station system 100 having a BBU 110 and a RRU 120 connected to the BBU. The method comprises receiving 402, from the RRU 120, information related to uplink signals received by the RRU from at least one UE 131, 132, 133 wirelessly connected to the RRU, determining 404, based on the received information, only a second part of precoding coefficients for precoding downlink signals to be sent by the RRU to the UEs, the precoding coefficients comprising a first part and the second part, and sending 406 the determined second part of the precoding coefficients to the RRU, so that the RRU can use the second part of the precoding coefficients together with the first part of the precoding coefficients for precoding downlink signals to be sent to the UEs.

The system of the wireless communication network that performs the method may be the BBU 110. Alternatively, the system that performs the method may be any other network node of the communication network, such as a node further away from the UE, e.g. another network element in the RAN or close to the RAN or another RAN node. In this alternative, the BBU 110 receives from the RRU 120, the information related to uplink signals received by the RRU 120 from the UEs, and communicates the information to the other network node for performing the determination 404, where after the other network node sends the determined second part of precoding coefficients back to the BBU 110 for further distribution to the RRU 120. Alternatively, the system of the communication network that performs the method may be a group of network nodes, wherein functionality for performing the method are spread out over different physical, or virtual, nodes of the network. The latter may be called a "cloud-solution".

The first part of the precoding coefficients are determined by the RRU. The RRU will use the second part of the precoding coefficients received from the system of the communication network in combination with the first part of the precoding coefficients that it has computed itself when precoding signals to be sent from the RRU towards the UEs. The system determines only a second part of the coefficients, and not all coefficients, including the first part as well as the second part of the coefficients. Consequently, only a smaller part, i.e. the second part of the coefficients have to be sent over the fronthaul link to the RRU compared to sending all precoding coefficients over the fronthaul link. Thereby, fronthaul link capacity is saved.

According to an embodiment, the second part of the precoding coefficients is determined 404 so as to pre-mitigate interference. Then the first part of the precoding coefficients are determined by the RRU so as to spatially concentrate energy transmitted from the antennas in directions towards the UEs.

According to another embodiment, the received information 402 is a downlink channel estimate of the uplink signals received by the RRU from the UEs. Alternatively, the received information 402 is measurements on the received uplink signals, and then the method comprises determining 403 a downlink channel estimate on the received measurements. Then, the determining 404 of the second part of the precoding coefficients is performed based on the determined downlink channel estimate.

According to another embodiment, the second part of the precoding coefficients is determined based on a Zero-forcing pre-cancellation operation on the downlink channel estimate. The Zero-forcing pre-cancellation operation may be performed according the following: The channel estimate is in a matrix format H, and the second part of the precoding coefficients is determined 404 as $(HH^*)^{-1}$, i.e. the Hermitian transpose of the channel estimate matrix H vector multiplied with the channel estimate matrix H, and taking the inverse of the vector multiplication. The Zero-forcing-based approach performs quite well when the interferences from neighboring cells are not considered.

According to another embodiment, the second part of the precoding coefficients may be determined based on Interference Rejection Combining, IRC or based on Minimum Mean square error, MMSE with the downlink channel estimate, when considering interferences from neighboring cells. When the interference is strong, IRC and MMSE can achieve even better performance than Zero-forcing, depending on the existing amount of information about noise and interference for the downlink channel. MMSE requires information of the noise/interference level. IRC needs the covariance matrix of the interferences and noise.

Basically, the proposed solution decomposes the determination of precoding coefficients into two parts, where a second smaller part is calculated by the BBU and sent to the RRU and the first part is calculated locally by the RRU. Therefore, the number of precoding coefficients that needs to be sent through the fronthaul link is reduced compared to sending all precoding coefficients. The first part is calculated by the RRU utilizing the fact that the RRU can estimate the channel by itself. The RRU then combines the first part and the second part of the precoding coefficient and precodes the transmit user layer signal accordingly. According to an embodiment, a solution is provided based on maximum ratio transmission, MRT, where the first part of the precoding coefficients are determined to spatially focusing the energy to the UEs by MRT, while the second part of the precoding coefficients performs interference pre-cancellation. This approach achieves less coefficients sent over the fronthaul link and better air interface performance than the prior art DS method descried in the Background.

Figure 5:
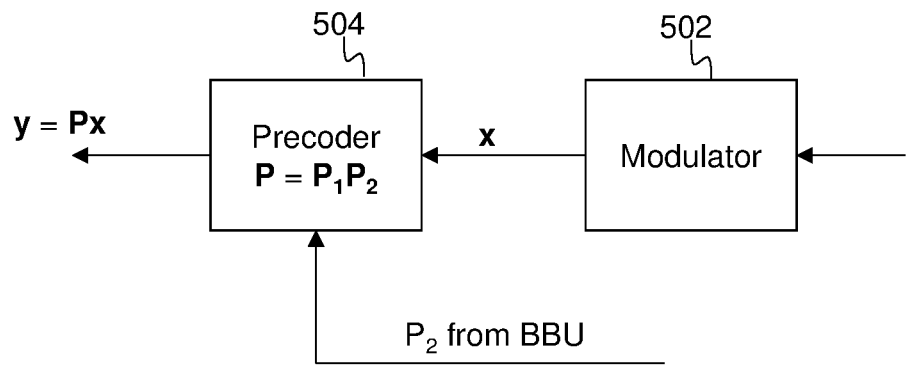
FIG. 5 is a schematic block diagram illustrating functionality of a RRU for handling a user data signal to be transmitted to UEs, according to a possible embodiment.

In the following, a model is used for describing some embodiments of the invention. In this model, the precoding coefficients are described in a matrix format and the downlink signals is described in a vector format. In the model, a massive MIMO system is assumed where the RRU has N antenna elements and there are K MIMO user layers. A precoder is set up that precodes the incoming signals of the K user layers so that the signals are spread to the N antenna elements. The precoder 502 has a precoding function with precoding coefficients that can be described in a matrix format P, as an N×K matrix per a group of subcarriers sharing the same precoding coefficients. According to the invention, the precoding coefficient matrix P is decomposed into a first multiplicative terms $P_1$, which is an N×R matrix symbolizing a first part of the precoding coefficients, and $P_2$, which is an R×K matrix symbolizing a second part of the precoding coefficients. Then $P_1$ is determined locally at the RRU and $P_2$ is determined by the BBU and sent from the BBU to the RRU over the fronthaul link. As R is set R≤N, the dimension of $P_2$ is smaller than P. Therefore, transporting $P_2$ over the fronthaul link instead of transporting all precoding coefficients P reduces the overhead over the fronthaul link by N/R times. For example, if N=64 and R=8, the number of precoding coefficients transported over the fronthaul ink is reduced by 8 times. FIG. 5 describes a RRU 120 having a function as described in the present embodiment. The RRU has a modulator 502 that modulates incoming coded data of each user layer to a modulated signal, based on e.g. QAM modulation. The modulated signals of all user layers can be modeled as x, in which each element represents a signal of a user layer. The RRU further has a precoder 504 that multiplies the incoming signals x with the precoding coefficients of the precoding matrix P to generate the transmit signals from each antenna, y. The precoding matrix P is in its turn achieved by combining a first part $P_1$ of the precoding coefficients, determined at the RRU, and a second part $P_2$ of the precoding coefficients, obtained over the fronthaul link from the BBU.

Figure 6:
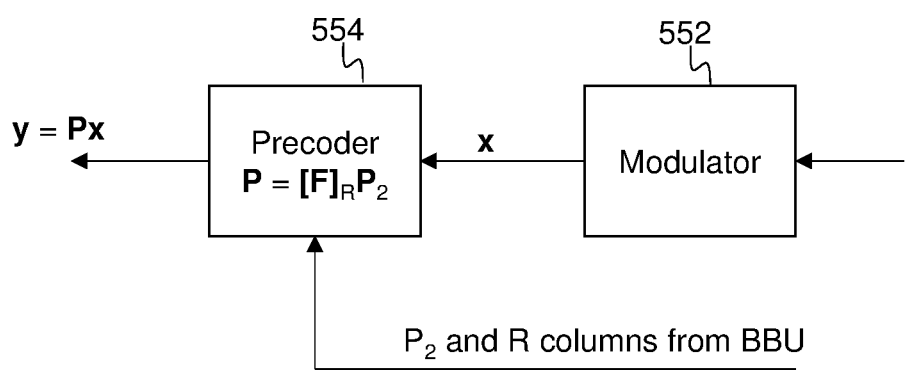
FIG. 6 is a schematic block diagram illustrating functionality of a RRU for handling a user data signal to be transmitted to UEs, according to a prior art DS method.

FIG. 6 describes another RRU having a function as in the prior art DS method. As in FIG. 5, the RRU comprises a modulator 552 and a precoder 554. In the DS method, $P_1$ can be modeled as a submatrix of a full fixed beamforming matrix F with the dimension of N×M, where M denotes the number of directions the beamforming is configured to point to. For example, for an N-element uniform linear array, the full fixed beamforming matrix can be an N×N DFT matrix forming N directions. The DS method selects R columns as $P_1 = [F]_R$, where $[F]_R$ denotes the submatrix of F with R selected columns. The information regarding which R columns are selected are also provided by the BBU together with $P_2$. Specifically, for a zeroforcing (ZF) precoder, $P_2 = (H[F]_R)^+$ where $A^+$ denotes the pseudo inverse of a matrix A.

In contrast to the DS method, the inventive method exploits the fact that the RRU has access to uplink channel information from which it can determine the channel downlink estimate itself. For example in a TDD system, the downlink channel information can be derived from the uplink channel information, from the reciprocity of the downlink and uplink channels. The RRU can estimate the uplink channel from e.g. received reference symbols transmitted by the UE, and then estimate the downlink channel accordingly. As discussed in relation to FIG. 5, embodiments of the present invention proposes to let the RRU calculate the first part of the precoding coefficients $P_1$ according to the channel information estimated in the RRU, instead of merely relying on the fixed beamforming matrix F in the DS method. As described before, a smaller matrix of the second part of the precoding coefficients $P_2$ is obtained from the BBU.

As the first part of the precoding coefficients $P_1$ is calculated by the RRU, and it is preferable to have a cost-efficient RRU, it is preferable to avoid high computational complexity in the RRU, e.g. avoiding matrix inversion operations for $P_1$ calculation. According to an embodiment, $P_1$ is determined by the RRU using an MRT-based operation on the downlink channel estimate in order to spatially concentrating the energy to the intended UEs. The MRT operation is as such a rather simple operation, i.e. not especially computationally complex. Further, the BBU determines the second part of the precoding coefficients $P_2$ in order to achieve interference mitigation for the downlink channel estimate, e.g. pre-cancellation of estimated interferences between user layers and/or mitigating estimated interferences to UEs in other cells, e.g. pre-nulling. In this embodiment, $P_2$ can be a K×K matrix. Thus it is possible to reduce the number of coefficients sent over the fronthaul link from the BBU to the RRU down to be only proportional to the number of user layers. More details describing embodiments for determining $P_1$ in order to spatially concentrate the transmit energy to the intended UEs and for determining $P_2$ in order to achieve interference mitigation are given in the following.

According to an embodiment, the method for determining the first part of the precoding coefficients $P_1$ and the second part of the precoding coefficients $P_2$ is derived from a zero-forcing, ZF, -based pre-cancellation scheme. Let H denote the downlink channel matrix in antenna-element/direction domain of size K×N, where N is the number of antenna elements and K is the number of MIMO user layer and K<<N. A ZF precoding matrix P, wherein $P=P_1P_2$, can be formulated as the pseudo inverse of the channel matrix H as $$P=H^+=H^*(HH^*)^{-1}x$$

where $H^+$ denotes the pseudo inverse of H, $H^*$ denotes the Hermitian transpose of H and $A^{-1}$ denotes the inverse of any square matrix A. Then the transmit signals after precoding can be expressed as $$y=Px=H^+x=H^*(HH^*)^{-1}x$$

In the above expression, we let $P_1=H^*$ and $P_2=(HH^*)^{-1}$. Then the transmit signal can be written as $$y=Px=P_1P_2x$$

In this way, the Hermitian transpose by $P_1$ represents a MRT operation, while $P_2$ represents a ZF pre-cancellation operation. Also $P_2$ is reduced to a K×K matrix and thereby the number of coefficients that needs to be sent through the fronthaul link is reduced to the number of user layers. The scheme can be extended to a direction domain implementation, where a fixed number of beams pointing to different directions covering a range of space of interest are generated simultaneously and the beamforming operations are performed before transmitting on these beams. In such a way, the channel is transferred to a direction domain based on these fixed beams. In the RRU, the precoded signals are transmitted to a fixed number of directions, modeled as a fixed beamforming matrix F. Then we define the direction domain-channel matrix as $$H_d=HF$$

where H denotes the original element-domain channel matrix and F denotes the fixed beamforming matrix. In this case, $P_1=FH_d^*$ and $P_2=(H_dH_d^*)^{-1}$.

The direction domain channel can be quite sparse, as the propagation concentrates to the directions towards the UEs and the main reflection points for the UEs. We can simplify $P_1$ to perform MRT on selected directions for each user-layer. This can reduce the complexity for calculating. In this case, $P_1$ with selective MRT can be expressed as $$P_1=FH_d^*$$

where $H_g$ denotes a sparse matrix of $H_d$ by keeping the selected R elements per row in $H_d$ and zeroing out the rest of the elements on each row. In this case, $P_2=(H_gH_g^*)^{-1}$.

Figure 7:
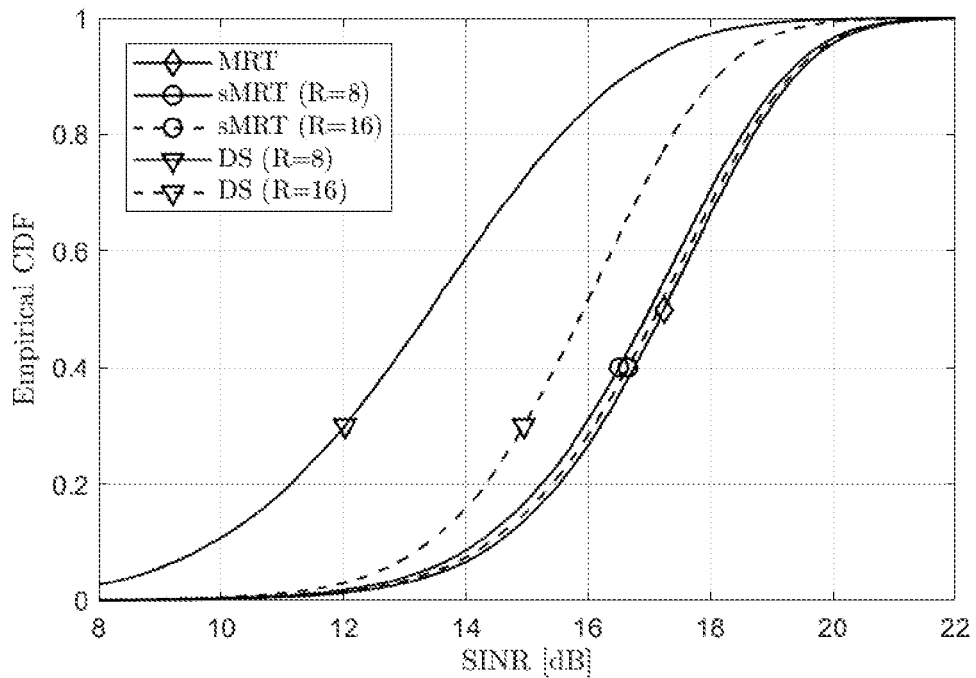
FIGS. 7-8 are x-y diagrams illustrating simulation results for SINR for a user data signal pre-coded using the method of the invention as well as using the prior art DS method.
Figure 8:
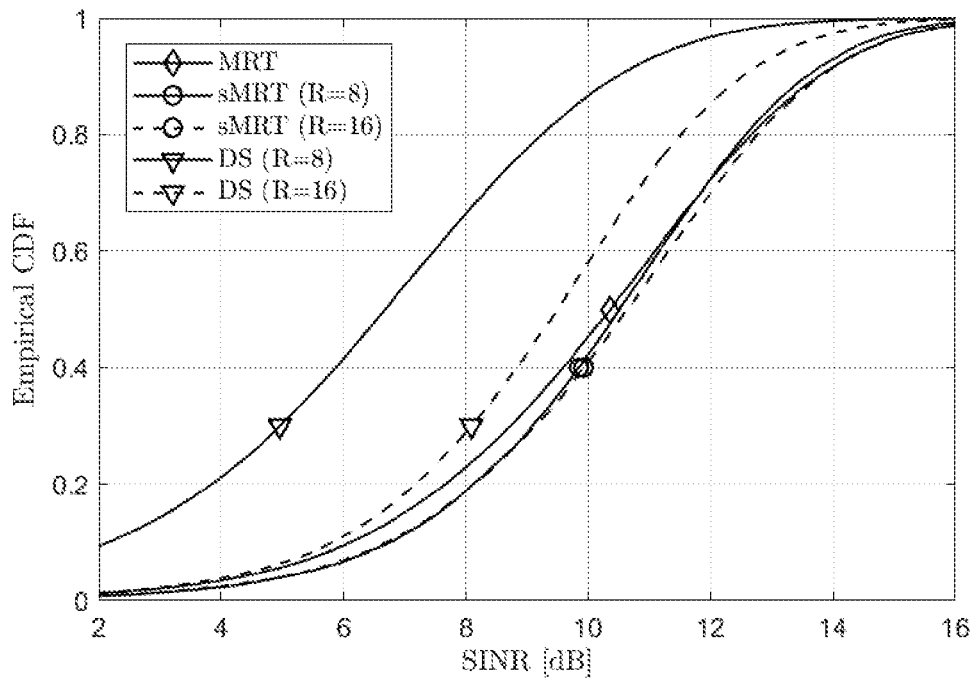

In order to determine the improvements achieved by embodiments of the present invention, simulations have been performed wherein a full MRT scheme is compared to a selective MRT scheme. $P_2$ is determined by the BBU and transmitted over the fronthaul link to the RRU and $P_1$ is determined by the RRU. A "full MRT scheme" signifies that the MRT is performed on all antenna elements or in all directions, this means at least theoretically all elements in $P_1$ could be non-zero. A "selective MRT scheme" signifies that for each user layer a subset of the elements or directions are selected for doing MRT, which means that some elements of $P_1$ are set to 0. The results are shown in FIGS. 7-8. The full MRT is called "MRT" and the selective MRT is called "sMRT" in FIGS. 7-8. Further, the results are compared in FIGS. 7-8 to simulations when the DS scheme has been used. FIGS. 7-8 show Signal to Interference Ratio, SINR, for simulated signals sent from a RRU to UEs, signals that have been precoded using the different schemes full MRT, selective MRT and DS, for R=8 and for R=16. For the DS method, R×K coefficients are to be determined at the BBU and sent over the fronthaul link to the RRU, the higher R the more coefficients are determined at the BBU. For both MRT and sMRT methods, K×K coefficients are to be determined at the BBU and sent over the fronthaul link to the RRU. For sMRT, R relates to the RRU complexity only. The lower R, the fewer MRT operations need to be done in RRU, which reduces the number of multiplications. R is the number of directions or antennas selected.

The simulation setup is as follows:
Antenna setting: 64-element uniform linear array with half wavelength spacing, wherein each antenna element is omni-directional.
UEs: 8 UEs having one antenna each. Therefore, 8 user-layers in total where each UE has one layer.
Multipath channel: The channel is modeled from the RRU perspective with 2 multipath clusters, each of which has 1 "Line-Of-Sight", LOS component representing the strong component in the cluster and 5 other multipath components in each cluster. The amplitude of each component is Rayleigh distributed and the phase is uniformly distributed in [−pi, pi]. The multipath components have 5-10 dB lower power than the LOS component. The power offset is uniformly distributed in [5 10] dB. Further, the angle of departure, AoD, of the LOS component is uniformly distributed in [−60, 60] degrees, assuming covering a 120-degree cell sector. The multipath components each has an angular spread of 5 degrees in each cluster with a uniform distribution in [−2.5, 2.5] degrees around the LOS AoD.
Received SNR per transmit antenna element is 0 dB
The simulation is down with a direction domain implementation with a 64-point DFT, i.e. FFT, generating 64 fixed directions.
In the DS scheme, the selection algorithm presented in the mentioned prior art "Low RF-Complexity Millimeter-Wave Beamspace-MIMO Systems by Beam Selection" is used, which maximizes the sum SINR of all user layers. Note that this selection algorithm is quite complicated. But it represents the best performance of the DS scheme in Literature.
In the sMRT, the strongest R directions are selected per user layer.

FIG. 7 shows SINR results when it is assumed that perfect channel information is accessible for calculating $P_1$ and $P_2$. The results show that the MRT scheme performs the best and theoretically achieves ZF precoding performance, in which $P_2$ only needs 8×8=64 coefficients. When using 8 selected directions, the DS scheme performs about 4 dB worse than the MRT at the $50^{th}$ percentile. Even if 16 selected directions is used, in which 16×8=128 coefficients is needed, the DS scheme performs about 1.2 dB worse than the MRT schemes at the 50$^{th}$ percentile. It means that the DS scheme needs to select even more directions to approach the MRT scheme, which means increasing the FH overhead. The sMRT scheme performs very close to the MRT scheme, even for R=8. Consequently, the sMRT schemes are performing clearly better than the DS scheme.

FIG. 8 shows SINR results when it is assumed that there are channel estimation errors. In this case, the channel estimation is performed in the direction domain to improve the estimation accuracy, i.e. increasing the estimation SNR for strong directions. The channel estimation SNR per transmit antenna element is set to be 3 dB. As can be seen in FIG. 8, and as expected, the performances of all schemes degrade compared to FIG. 7, due to the presence of the channel estimation errors. The MRT schemes still perform clearly better than the DS scheme. For example, for DS and 16 directions (R=16), the result is still about 1 dB worse than the full MRT scheme. Also, the full MRT scheme is not the best any more. It performs slightly worse than the sMRT schemes, especially for the region of lower achieved SINR. It is because of the fact that the weak directions may negatively contribute to the performance due to large channel estimation errors on these directions. It is beneficial to exclude them from the MRT process.

To conclude, the simulations presented in FIGS. 7 and 8 show that for perfect channel information as well as for simulated channel estimation errors, the MRT-based schemes are much better than the DS scheme. The DS scheme needs more than doubled number of coefficients to approach the MRT-based schemes. The MRT-based schemes are able to reduce the number of coefficients through the fronthaul link to the number of user layers, while achieving high performance at the air interface. Comparing to the original case of transporting 64×8=512 coefficients in the simulation, the sMRT and the MRT-based scheme only needs to transport 8×8=64 coefficients. Consequently, eight times reduction is achieved.

Figure 9:
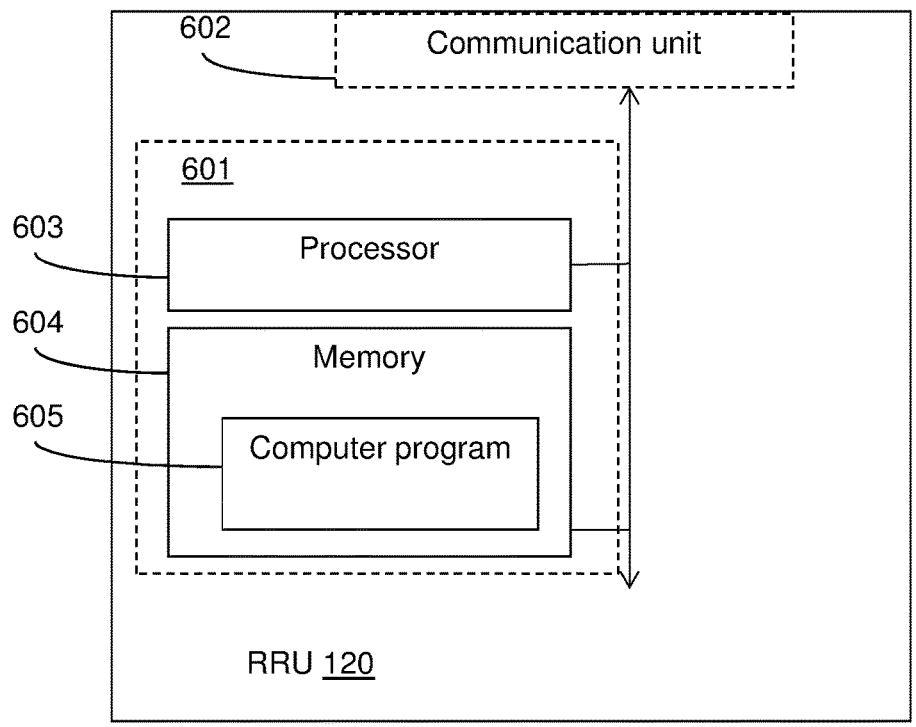
FIGS. 9-10 are block diagrams illustrating a RRU in more detail, according to further possible embodiments.

FIG. 9, in conjunction with FIG. 2, shows a RRU 120 operable in a distributed base station system 100 of a wireless communication network. The distributed base station system 100 further comprises a BBU 110 connected to the RRU. The RRU 120 is operative for wireless communication with at least one UE 131, 132, 133 through a plurality of antennas 121, 122, 123. The RRU 120 comprises a processor 603 and a memory 604. Said memory contains instructions executable by said processor, whereby the RRU 120 is operative for receiving uplink signals from the at least one UE, determining a downlink channel estimate from the received uplink signals, and determining a first part of precoding coefficients to be used for precoding signals to be sent downlink to the at least one UE based on the determined downlink channel estimate. The RRU 120 is further operative for sending information related to the received uplink signals to the BBU, receiving a second part of the precoding coefficients from the BBU, the second part of the precoding coefficients being determined based on the sent information, precoding downlink signals of data received from the BBU using the first and the second part of the precoding coefficients, and sending the precoded downlink signals to the at least one UE via the plurality of antennas.

According to an embodiment, the RRU is further operative for combining the first part of the precoding coefficients with the second part of the precoding coefficients before the precoding of the downlink signals with the combined first and second parts of the precoding coefficients.

According to another embodiment, the first part of the precoding coefficients contains more information than the second part of the precoding coefficients.

According to another embodiment, the RRU is operative for determining the first part of the precoding coefficients so as to spatially concentrate energy transmitted from the antennas in directions towards the UEs. Further, the second part of the precoding coefficients is determined so as to pre-mitigate interference.

According to another embodiment, the RRU is operative for determining the first part of the precoding coefficients based on a MRT operation on the downlink channel estimate.

According to another embodiment, the RRU is operative for determining the downlink channel estimate in a matrix format H, and for determining the first part of the precoding coefficients as H*, i.e. the Hermitian transpose of the downlink channel estimate matrix H.

According to other embodiments, the RRU 120 may further comprise a communication unit 602, which may be considered to comprise conventional means for communication with a BBU 120 over the fronthaul link 140 (FIG. 2), as well as conventional means for wireless communication with the UEs 121, 122, 123, such as transceiver for wireless communication. The instructions executable by said processor 603 may be arranged as a computer program 605 stored e.g. in said memory 604. The processor 603 and the memory 604 may be arranged in a sub-arrangement 601. The sub-arrangement 601 may be a micro-processor and adequate software and storage therefore, a Programmable Logic Device, PLD, or other electronic component(s)/processing circuit(s) configured to perform the methods mentioned above.

The computer program 605 may be arranged such that when its instructions are run in the processor 603, they cause the RRU 120 to perform the steps described in any of the described embodiments of the RRU 120. The computer program 605 may be carried by a computer program product connectable to the processor 603. The computer program product may be the memory 604, or at least arranged in the memory. The memory 604 may be realized as for example a RAM (Random-access memory), ROM (Read-Only Memory) or an EEPROM (Electrical Erasable Programmable ROM). Further, the computer program 605 may be carried by a separate computer-readable medium, such as a CD, DVD or flash memory, from which the program could be downloaded into the memory 604. Alternatively, the computer program may be stored on a server or any other entity connected to the wireless communication network to which the RRU 120 has access via the communication unit 602. The computer program 605 may then be downloaded from the server into the memory 604.

Figure 10:
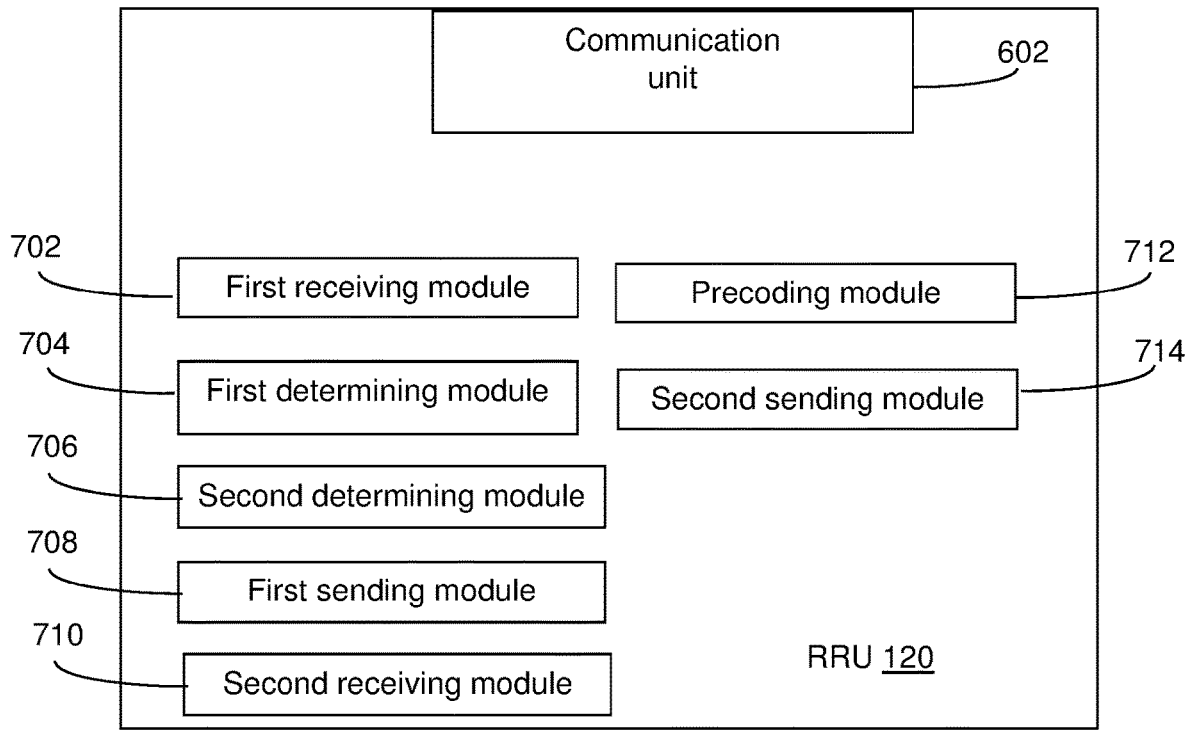

FIG. 10, in conjunction with FIG. 2, describes another embodiment of a RRU 120 operable in a distributed base station system 100 of a wireless communication network. The distributed base station system 100 further comprises a BBU 110 connected to the RRU. The RRU 120 is operative for wireless communication with at least one UE 131, 132, 133 through a plurality of antennas 121, 122, 123. The RRU 120 comprises a first receiving module 702 for receiving uplink signals from the at least one UE, a first determining module 704 for determining a downlink channel estimate from the received uplink signals, and a second determining module 706 for determining a first part of precoding coefficients to be used for precoding signals to be sent downlink to the at least one UE based on the determined downlink channel estimate. The RRU 120 further comprises a first sending module 708 for sending information related to the received uplink signals to the BBU, a second receiving module 710 for receiving a second part of the precoding coefficients from the BBU, the second part of the precoding coefficients being determined based on the sent information, a precoding module 712 for precoding downlink signals of data received from the BBU using the first and the second part of the precoding coefficients, and a second sending module 714 for sending the precoded downlink signals to the at least one UE via the plurality of antennas. The RRU 120 may further comprise a communication unit 602 similar to the communication unit described in FIG. 9.

Figure 11:
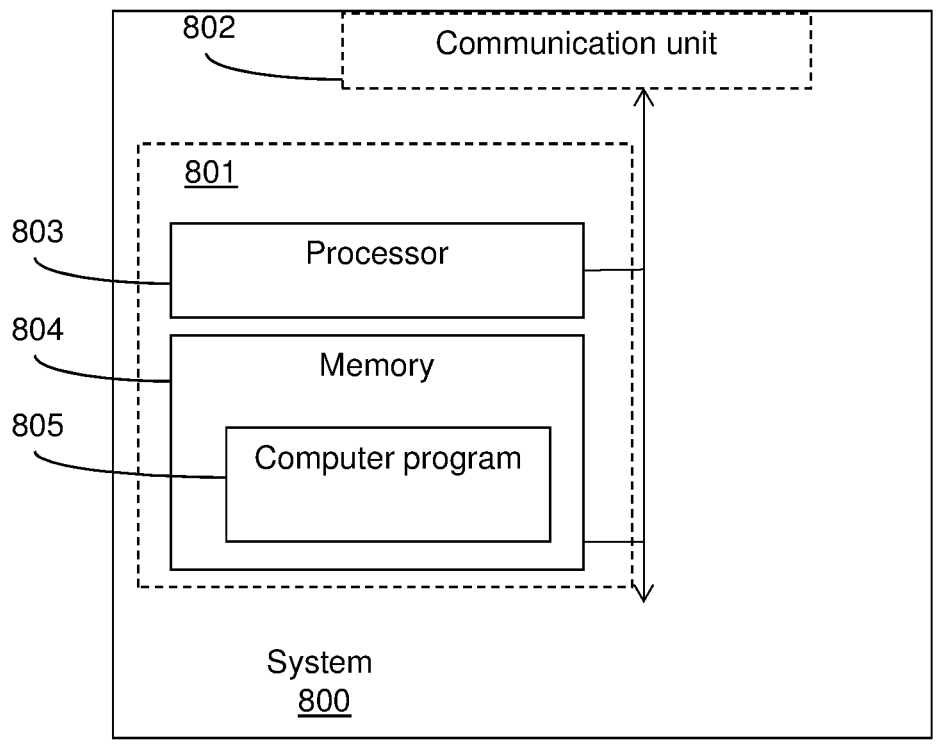
FIGS. 11-12 are block diagrams illustrating a BBU in more detail, according to further possible embodiments.

FIG. 11, in conjunction with FIG. 2, shows a system 800 operable in a wireless communication network. The wireless communication network comprises a distributed base station system 100 having a BBU 110 and a RRU 120 connected to the BBU. The system 800 comprises a processor 803 and a memory 804. Said memory contains instructions executable by said processor, whereby the system 800 is operative for receiving, from the RRU 120, information related to uplink signals received by the RRU from at least one UE 131, 132, 133 wirelessly connected to the RRU. The system 800 is further operative for determining, based on the received information, only a second part of precoding coefficients for precoding downlink signals to be sent by the RRU to the UEs, the precoding coefficients comprising a first part and the second part, and sending the determined second part of the precoding coefficients to the RRU, so that the RRU can use the second part of the precoding coefficients together with the first part of the precoding coefficients for precoding downlink signals to be sent to the UEs.

The system 800 operable in the wireless communication network may be arranged in the BBU 110. Alternatively, the system 800 may be arranged in any other network node of the wireless communication network, such as a node further away from the UE, e.g. another network element in the RAN or close to the RAN or another RAN node. In this alternative, the BBU 110 receives from the RRU 120, the information related to uplink signals received by the RRU 120 from the UEs, and communicates the information to the other network node where the system 800 is arranged, for performing the determination 404, where after the other network node sends the determined second part of precoding coefficients back to the BBU 110 for further distribution to the RRU 120. Alternatively, the system 800 may be arranged spread out over a group of network nodes, wherein functionality of the system is spread out over different physical, or virtual, nodes of the network. The latter may be called a "cloud-solution".

According to an embodiment, the system 800 is operative for determining the second part of the precoding coefficients so as to pre-mitigate interference.

According to another embodiment, the received information is a downlink channel estimate of the uplink signals received by the RRU 120 from the UEs 131-133, or the received information is measurements on the received uplink signals and the system 800 is further operative for determining a downlink channel estimate on the received measurements. Further, the system is operative for determining the second part of the precoding coefficients based on the determined downlink channel estimate.

According to another embodiment, the system 800 is further operative for determining the second part of the precoding coefficients based on a Zero-forcing pre-cancellation operation on the downlink channel estimate.

According to another embodiment, the system 800 is operative determining the second part of the precoding coefficients based on IRC or on MMSE on the downlink channel estimate.

According to other embodiments, the system 800 may further comprise a communication unit 802, which may be considered to comprise conventional means for communication with a RRU 120 over the fronthaul link 140 (FIG. 2). The instructions executable by said processor 803 may be arranged as a computer program 805 stored e.g. in said memory 804. The processor 803 and the memory 804 may be arranged in a sub-arrangement 801. The sub-arrangement 801 may be a micro-processor and adequate software and storage therefore, a Programmable Logic Device, PLD, or other electronic component(s)/processing circuit(s) configured to perform the methods mentioned above.

The computer program 805 may be arranged such that when its instructions are run in the processor 803, they cause the system 800 to perform the steps described in any of the described embodiments of the system 800. The computer program 805 may be carried by a computer program product connectable to the processor 803. The computer program product may be the memory 604, or at least arranged in the memory. The memory 604 may be realized as for example a RAM (Random-access memory), ROM (Read-Only Memory) or an EEPROM (Electrical Erasable Programmable ROM). Further, the computer program 605 may be carried by a separate computer-readable medium, such as a CD, DVD or flash memory, from which the program could be downloaded into the memory 604. Alternatively, the computer program may be stored on a server or any other entity connected to the wireless communication network to which the system 800 has access via the communication unit 802. The computer program 805 may then be downloaded from the server into the memory 804.

Figure 12:
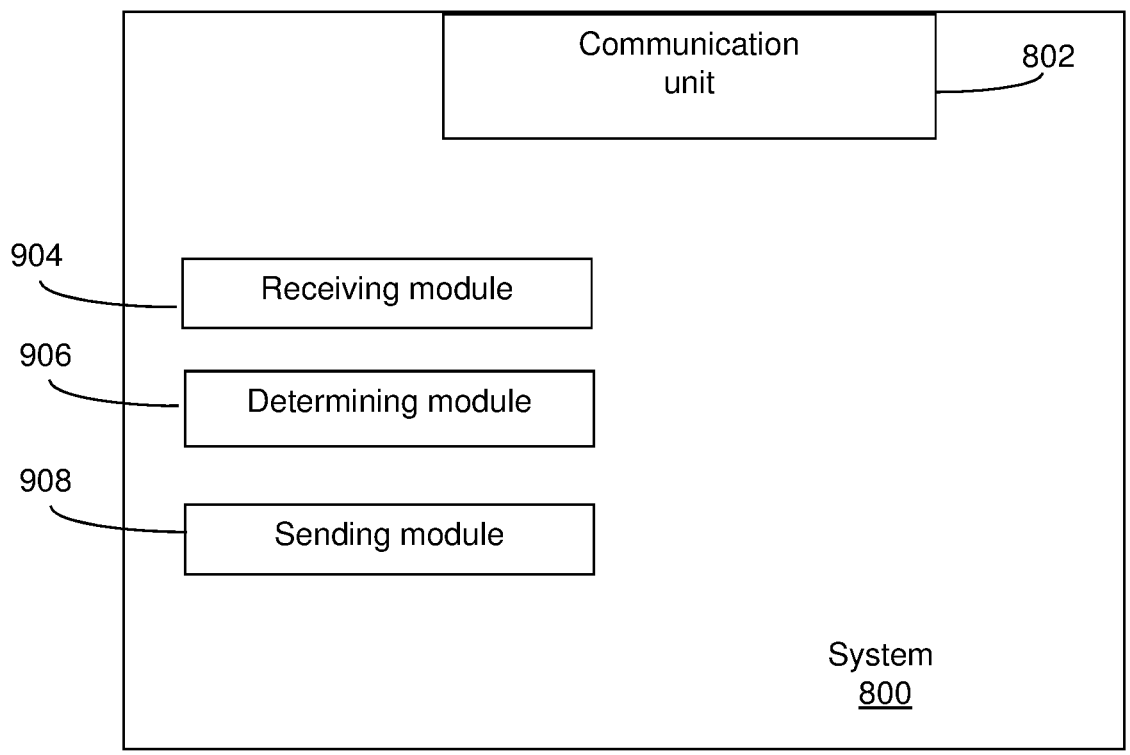

FIG. 12, in conjunction with FIG. 2, describes another embodiment of a system 800 operable in a wireless communication network. The wireless communication network comprises a distributed base station system 100 having a BBU 110 and a RRU 120 connected to the BBU. The system 800 comprises a receiving module 904 for receiving, from the RRU 120, information related to uplink signals received by the RRU from at least one UE 131, 132, 133 wirelessly connected to the RRU, and a determining module 906 for determining, based on the received information, only a second part of precoding coefficients for precoding downlink signals to be sent by the RRU to the UEs, the precoding coefficients comprising a first part and the second part. The system 800 further comprises a sending module 908 for sending the determined second part of the precoding coefficients to the RRU, so that the RRU can use the second part of the precoding coefficients together with the first part of the precoding coefficients for precoding downlink signals to be sent to the UEs. The system 800 may further comprise a communication unit 802 similar to the communication unit described in FIG. 11.

Although the description above contains a plurality of specificities, these should not be construed as limiting the scope of the concept described herein but as merely providing illustrations of some exemplifying embodiments of the described concept. It will be appreciated that the scope of the presently described concept fully encompasses other embodiments which may become obvious to those skilled in the art, and that the scope of the presently described concept is accordingly not to be limited. Reference to an element in the singular is not intended to mean "one and only one" unless explicitly so stated, but rather "one or more." All structural and functional equivalents to the elements of the above-described embodiments that are known to those of ordinary skill in the art are expressly incorporated herein by reference and are intended to be encompassed hereby. Moreover, it is not necessary for an apparatus or method to address each and every problem sought to be solved by the presently described concept, for it to be encompassed hereby. In the exemplary figures, a broken line generally signifies that the feature within the broken line is optional.

The invention claimed is:

1. A method performed by a remote radio unit (RRU) of a distributed base station system of a wireless communication network, the distributed base station system further comprising a base band unit (BBU) connected to a core network and to the RRU, the RRU being connected to a plurality of antennas for beamforming through which the RRU wirelessly communicates with at least one user equipment (UE), the method comprising:
    receiving uplink signals from the at least one UE;
    determining a downlink channel estimate from the received uplink signals;
    determining a first part of precoding coefficients to be used for precoding signals to be sent downlink to the at least one UE based on the determined downlink channel estimate;
    sending information related to the received uplink signals to the BBU via a fronthaul link;
    receiving a second part of the precoding coefficients from the BBU via the fronthaul link, the second part of the precoding coefficients being determined based on the sent information;
    combining the first part of the precoding coefficients with the second part of the precoding coefficients into a combined matrix of precoding coefficients for beamforming;
    precoding downlink signals of data received from the BBU using the combined matrix; and
    sending beamformed downlink signals to the at least one UE via the plurality of antennas.

2. The method according to claim 1, wherein the first part of the precoding coefficients contains more information than the second part of the precoding coefficients.

3. The method according to claim 1, wherein the first part of the precoding coefficients is determined so as to spatially concentrate energy transmitted from the antennas in directions towards the at least one UE and wherein the second part of the precoding coefficients is determined so as to pre-mitigate interference.

4. The method according to claim 1, wherein the first part of the precoding coefficients is determined based on a Maximum Ratio Transmission (MRT) operation on the downlink channel estimate.

5. A method performed by a system of a wireless communication network, the wireless communication network comprising a distributed base station system having a base band unit (BBU) connected to a core network and a remote radio unit (RRU) connected to the BBU and connected to a plurality of antennas for beamforming through which the RRU wirelessly communicates with at least one user equipment (UE), the method comprising:
    receiving, by the BBU from the RRU via a fronthaul link, information related to uplink signals received by the RRU from at least one user equipment (UE) wirelessly connected to the RRU;
    determining, by the BBU based on the received information, only a second part of precoding coefficients for precoding downlink signals to be sent by the RRU to the at least one UE, the precoding coefficients comprising a first part and the second part; and
    sending, by the BBU via the fronthaul link, the determined second part of the precoding coefficients to the RRU, so that the RRU can combine the second part of the precoding coefficients together with the first part of the precoding coefficients, determined by the RRU, into a combined matrix for precoding downlink signals using the combined matrix to send beamformed downlink signals to the at least one UE via the plurality of antennas.

6. The method according to claim 5, wherein the second part of the precoding coefficients is determined so as to pre-mitigate interference.

7. The method according to claim 5, wherein the received information is a downlink channel estimate of the uplink signals received by the RRU from the at least one UE, or wherein the received information is measurements on the received uplink signals and the method further comprises determining a downlink channel estimate on the measurements, and wherein the determining of the second part of the precoding coefficients is performed based on the determined downlink channel estimate.

8. The method according to claim 7, wherein the second part of the precoding coefficients is determined based on Interference Rejection Combining (IRC) or on Minimum Mean square error (MMSE) on the downlink channel estimate.

9. A remote radio unit (RRU) operable in a distributed base station system of a wireless communication network, the distributed base station system further comprising a base band unit (BBU) connected to a core network and to the RRU, the RRU being operative for wireless communication with at least one UE through a plurality of antennas for beamforming, the RRU comprising:
    a processor; and
    a memory containing instructions which, when executed by said processor, cause the RRU to:
        receive uplink signals from the at least one UE;
        determine a downlink channel estimate from the received uplink signals;
        determine a first part of precoding coefficients to be used for precoding signals to be sent downlink to the at least one UE based on the determined downlink channel estimate;
        send information related to the received uplink signals to the BBU via a fronthaul link;
        receive a second part of the precoding coefficients from the BBU via the fronthaul link, the second part of the precoding coefficients being determined based on the sent information;
        combine the first part of the precoding coefficients with the second part of the precoding coefficients into a combined matrix of precoding coefficients for beamforming;
        precode downlink signals of data received from the BBU using the combined matrix; and
        send beamformed downlink signals to the at least one UE via the plurality of antennas.

10. The RRU according to claim 9, wherein the first part of the precoding coefficients contains more information than the second part of the precoding coefficients.

11. The RRU according to claim 9, operative to determine the first part of the precoding coefficients so as to spatially concentrate energy transmitted from the antennas in directions towards the at least one UE and wherein the second part of the precoding coefficients is determined so as to pre-mitigate interference.

12. The RRU according to claim 9, operative to determine the downlink channel estimate in a matrix format H, and to determine the first part of the precoding coefficients as H*, which is a Hermitian transpose of the downlink channel estimate in matrix format H.

13. A system operable in a wireless communication network, the wireless communication network comprising a distributed base station system having a base band unit (BBU) connected to a core network and a remote radio unit (RRU) connected to the BBU and connected to a plurality of antennas for beamforming through which the RRU wirelessly communicates with at least one user equipment (UE), the system comprising:
a processor; and
a memory containing instructions which, when executed by said processor, cause the system to:
receive, by the BBU from the RRU via a fronthaul link, information related to uplink signals received by the RRU from at least one user equipment (UE) wirelessly connected to the RRU;
determine, by the BBU based on the received information, only a second part of precoding coefficients for precoding downlink signals to be sent by the RRU to the at least one UE, the precoding coefficients comprising a first part and the second part; and
send, by the BBU via the fronthaul link, the determined second part of the precoding coefficients to the RRU, so that the RRU can combine the second part of the precoding coefficients together with the first part of the precoding coefficients determined by the RRU, into a combined matrix for precoding downlink signals using the combined matrix to send beamformed downlink signals to the at least one UE via the plurality of antennas.

14. The system according to claim 13, operative for determining the second part of the precoding coefficients so as to pre-mitigate interference.

15. The system according to claim 13, wherein the received information is a downlink channel estimate of the uplink signals received by the RRU from the at least one UE, or wherein the received information is measurements on the received uplink signals and the system is further operative to determine a downlink channel estimate on the measurements, and wherein the system is operative to determine the second part of the precoding coefficients based on the determined downlink channel estimate.

16. The system according to claim 15, operative to determine the second part of the precoding coefficients based on a Zero-forcing pre-cancellation operation on the downlink channel estimate.

17. A non-transitory computer-readable storage medium comprising instructions which, when executed by at least one processor in a remote radio unit (RRU) of a distributed base station system of a wireless communication network, wherein the distributed base station system further comprising a base band unit (BBU) connected to a core network and to the RRU and wherein the RRU communicates with at least one user equipment (UE) through a plurality of antennas for beamforming, are capable of causing the RRU to perform operations comprising:
receiving uplink signals from the at least one UE;
determining a downlink channel estimate from the received uplink signals;
determining a first part of precoding coefficients to be used for precoding signals to be sent downlink to the at least one UE based on the determined downlink channel estimate;
sending information related to the received uplink signals to the BBU via a fronthaul link;
receiving a second part of the precoding coefficients from the BBU via the fronthaul link, the second part of the precoding coefficients being determined based on the sent information;
combining the first part of the precoding coefficients with the second part of the precoding coefficients into a combined matrix of precoding coefficients for beamforming;
precoding downlink signals of data received from the BBU using the combined matrix; and
sending beamformed downlink signals to the at least one UE via the plurality of antennas.

18. A non-transitory computer-readable storage medium comprising instructions which, when run on a processor of a system of a wireless communication network, wherein the wireless communication network comprising a distributed base station system having a base band unit (BBU) connected to a core network and a remote radio unit (RRU) connected to the BBU and connected to a plurality of antennas for beamforming through which the RRU wirelessly communicates with at least one user equipment (UE), are capable of causing the system to perform operations comprising:
receiving, by the BBU from the RRU via a fronthaul link, information related to uplink signals received by the RRU from at least one user equipment (UE) wirelessly connected to the RRU;
determining, by the BBU based on the received information, only a second part of precoding coefficients for precoding downlink signals to be sent by the RRU to the at least one UE, the precoding coefficients comprising a first part and the second part; and
sending, by the BBU via the fronthaul link, the determined second part of the precoding coefficients to the RRU, so that the RRU can combine the second part of the precoding coefficients together with the first part of the precoding coefficients determined by the RRU, into a combined matrix for precoding downlink signals using the combined matrix to send beamformed downlink signals to the at least one UE via the plurality of antennas.

* * * * *